C. H. SMITH.
ELECTRIC SCORE BOARD.
APPLICATION FILED DEC. 2, 1911.
1,089,798.
Patented Mar. 10, 1914.
2 SHEETS—SHEET 1.
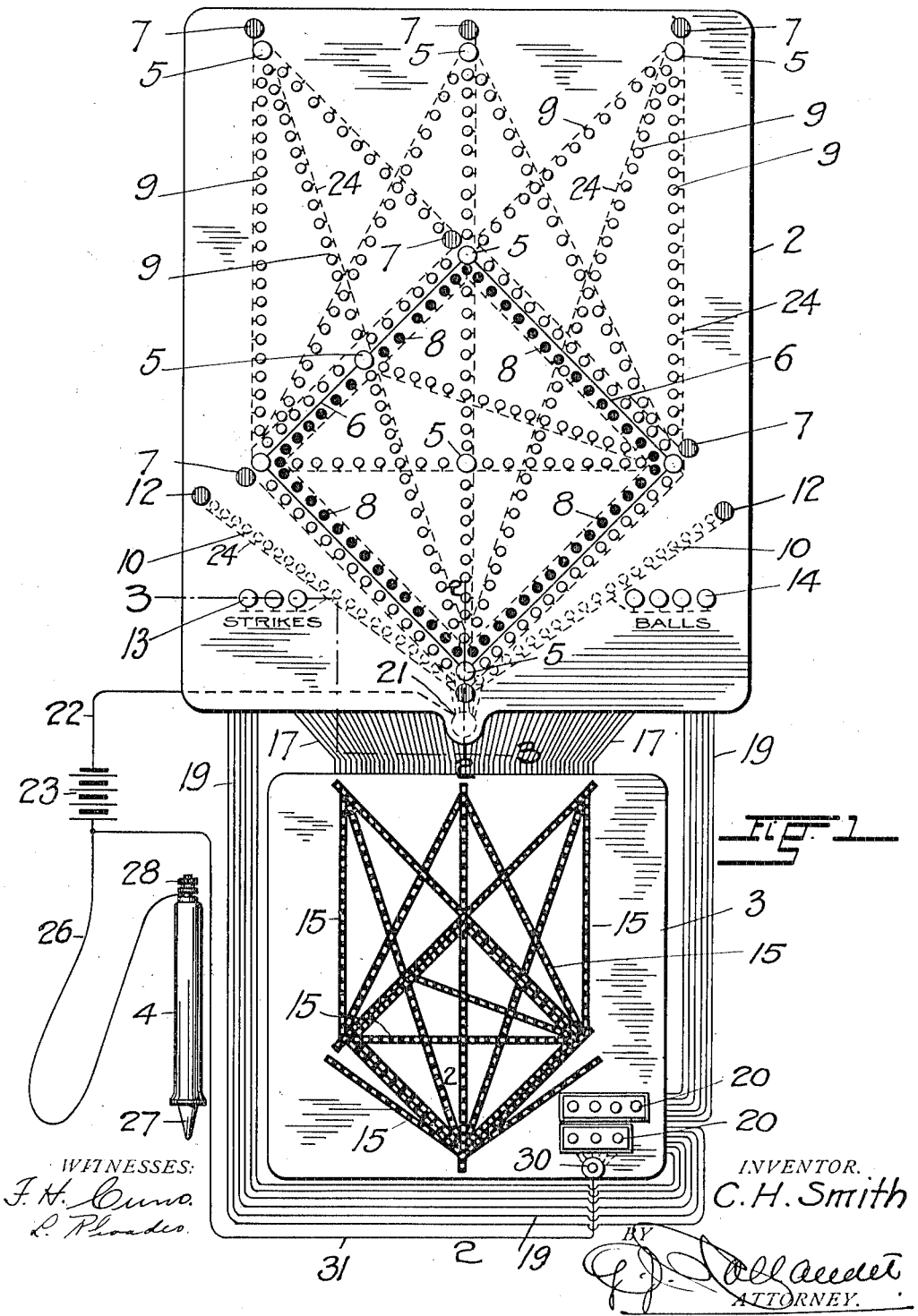
WITNESSES:
INVENTOR.
C. H. Smith C. H. SMITH.
ELECTRIC SCORE BOARD.
APPLICATION FILED DEC. 2, 1911.
1,089,798.
Patented Mar. 10, 1914.
2 SHEETS—SHEET 2.
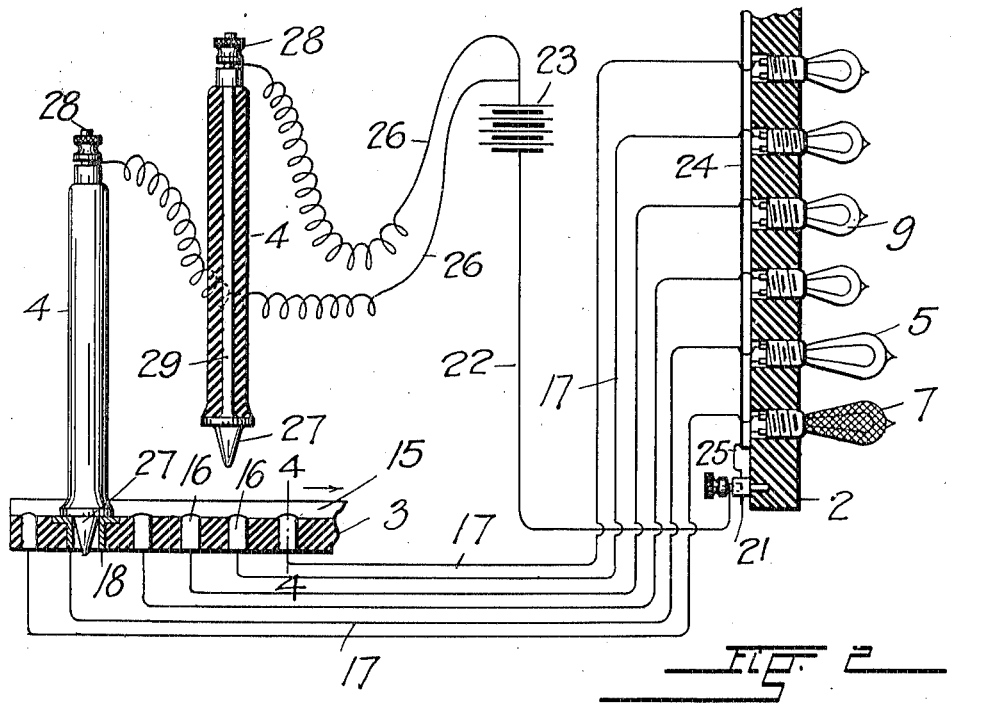
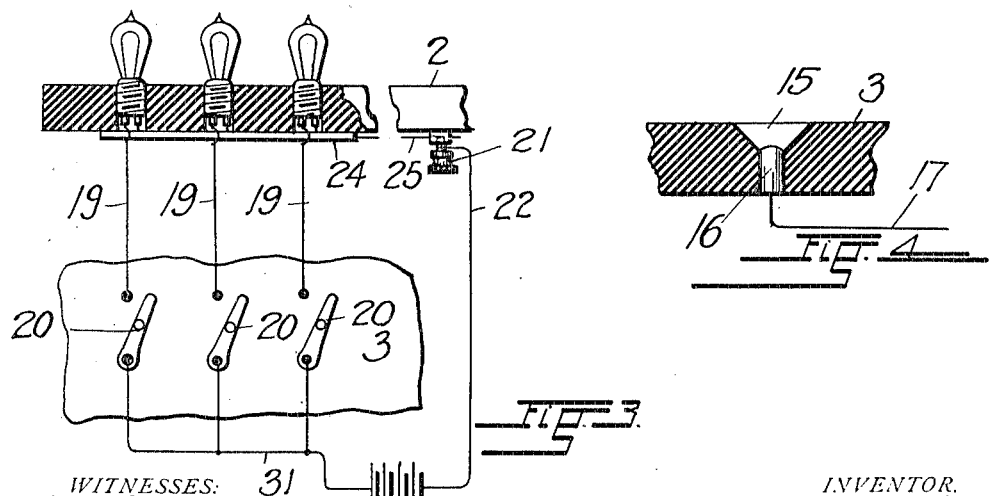
WITNESSES:
INVENTOR.
C. H. Smith

UNITED STATES PATENT OFFICE.

CHARLES H. SMITH, OF WORCESTER, MASSACHUSETTS.

ELECTRIC SCORE-BOARD.

1,089,798.      Specification of Letters Patent.      Patented Mar. 10, 1914.

Application filed December 2, 1911. Serial No. 663,522.

*To all whom it may concern:*

Be it known that I, CHARLES H. SMITH, a citizen of the United States, residing at Worcester, in the county of Worcester and State of Massachusetts, have invented certain new and useful Improvements in Electric Score-Boards, of which the following is a specification.

My invention relates to new and useful improvements in electric score-boards and its object resides in the provision of an association of electrical devices whereby the progress of a game of base ball may be clearly shown upon a board or other display-surface so that at points remote from the place at which a game is being played, spectators can observe the various features thereof, as clearly as if they were watching the play itself.

By the use of my invention, the courses of the runners and of the ball are clearly indicated, as well as the results of the various moves in the game at the distinctive points at which they are made and these objects of my invention are attained by the use of an apparatus of simple construction, an embodiment of which has been shown in the accompanying drawings in the various views of which like parts are similarly designated, and in which—

Figure 1 represents a face view of the score-board and the therewith electrically connected operating board and stylus. Fig. 2 a fragmentary sectional view of the three elements comprised in my invention, the sections of the two boards having been taken along lines 2—2, Fig. 1, and drawn to an enlarged scale. Fig. 3 an enlarged fragmentary view, partially in section of the means whereby "strikes" and "balls" are indicated on the score-board, the section of the score-board having been taken along the line 3—3, Fig. 1 and the electric switches on the operating board having been shown by means of the conventional symbols, and Fig. 4 a transverse section taken along the line 4—4, Fig. 2.

Referring to the drawings by numerical reference characters, the numeral 2 designates the score board which is usually placed at an elevation, in a perpendicular position, 3 the operating board which, in practice, is preferably placed, face upwardly, upon a table or other suitable support, and 4 the styli used by the operator for making the electric connections which cause the moves made in the game to be indicated on the score-board.

The stations of the players are established on the score board by means of incandescent electric lamps 5, those at the four bases being preferably connected by painted lines 6 to indicate the diamond. At each station with the exception of those of the pitchers and the short-stop, a similar lamp 7 of different color, is placed adjacent the other, and serves to indicate, when flashed, that a ball or runner is "out" at the station at which it is located. The courses taken by the runner from one base to another are indicated by series 8, of equidistant lamps of less candle power than the others and preferably of a different color, the courses of the ball between the various stations are likewise shown by series of equidistant lamps 9 which while in color the same as those located directly at the stations, are of a smaller size, and series of lamps 10 of still another color extend in opposite directions from the lamp at the "home plate" to designate the directions taken by "foul" balls. Larger lamps 12 of either the same or a different color are located at the ends of the series 10 to be flashed in case the ball is "out on a foul."

Two groups of lamps respectively designated by the numerals 13 and 14 are placed on the board outside the field, one of said groups containing three lamps to indicate the number of "strikes" while the other comprises four lamps which serve to show the number of "balls" made while the ball is being pitched to the batter.

The operating board 3 has in its face series of grooves 15 which in their relative positions, correspond with the several series of lamps on the score board, and each of these grooves has in its bottom, a series of equidistant contact-plugs 16 which by means of electric conductors 17 are separately connected with one of the terminals of the lamps in the corresponding series on the board 2, and the contacts 18 near the ends of these grooves, which correspond and are connected with the lamps 5 at the stations on the score board, are socketed to receive the point of the stylus 4 for the purpose of continuing the connection and maintain the respective lamps at the stations in a lighted condition while the operator is indicating other features of the play at different points or along other lines.

The lamps in the groups 13 and 14 which serve to respectively indicate the number of "strikes" and "balls" on the score-board, are separately connected at one of their terminals, by means of conductors 19, with one of the contacts of switches 20 which are arranged in corresponding groups on the operating board 3 and which may be of any desired character or construction.

The opposite terminals of all the lamps on the score board are electrically connected with a binding post 21 which, by means of a conductor 22, is connected with one of the poles of a source of electricity 23, the connections between the lamps and the post being established by any suitable means such as conductors 24 placed along the several series as indicated in Figs. 1, 2 and 3, and which are connected with the binding post by means of wires 25.

The styli used in operating the score-board, are connected with the opposite pole of the source 23 by wires 26 and they are each composed of a handle of non-conductive material which carries at its opposite ends a metallic point 27 and a binding screw 28 electrically connected by a metallic core 29.

The contacts of the switches 20 opposite to those connected with the lamps in the groups 13 and 14, are connected with a binding post 30 on the operating board, as shown in Fig. 1, and this post is connected by means of a wire 31 with the pole of the source opposite to that which connects with the binding post 21 on the score-board.

While a game of base ball is in progress, an operator who usually receives information of the different moves made in the game, by telegraph or telephone, traces the courses of the runners and the balls by drawing one of the styli through the grooves in the operating board corresponding with the series of lamps on the score-board which correspond with the said courses thereby causing the lamps in said series to flash successively. When the runner of the ball is "safe," the operator places the point of the stylus in the socket at the end of the groove, which is connected with the lamp 5 at the station at which the play has been made, or if the ball or the runner is "out," the operator flashes by contact of the stylus, the differently colored lamp 7 adjacent the station at which this feature in the play, has taken place. The operator indicates in the same manner the direction of a "foul" ball by drawing a stylus through one or the other of the grooves corresponding with the series of lamps 10 and in case a ball is "out on the foul" he flashes the lamp 12 at the end of said series.

The "strikes" and "balls" made while the ball is being pitched to the batter are indicated by lighting the lamps in the groups 13 and 14 by adjustment of the proper switches, and when after a play is made, a new player goes to bat, or when the runner leaves a base, the stylus is removed from the socket in which it was disposed, it being understood that while one or more styli are supported in the sockets on the operating board, others are used to indicate the courses of the ball and runners by drawing them along the guide ways in the board.

While I have shown and described my invention in the best form at present known to me, variations in the construction of the elements and in the system of electric connections may be made within the spirit of the invention.

What I claim and desire to secure by Letters-Patent is:—

1. In apparatus of the class described, the combination with a score-board having series of lamps arranged at determinate points and along lines between said points, of an operating board having guide ways arranged in correspondence with the arrangement of the lines on the score board, successions of insulated contacts along said guide-ways separately in circuits with the lamps contained in the series along the respective lines on the score board, contact sockets at the ends of said guide ways in separate circuits with the lamps at the points at the ends of the corresponding lines on the score board, and a stencil having a contact member connected in said circuits, said contacts being adapted to be successively engaged by said member when continuously moved along said guide ways, and the said member being made to fit any one of the said sockets whereby to hold the stencil in place therein and thus continuously close the circuit in which the socket is connected.

2. In apparatus of the class described, the combination with a score-board having series of lamps arranged at determinate points and along lines between said points, of an operating board having guide ways arranged in correspondence with the arrangement of the said lines on the score-board, successions of insulated contacts along said guide ways, separately in circuits with the respective lamps along the respective lines on the score board, and a stencil having a contact member connected in all the circuits and adapted to engage the said contacts when the stencil is moved continuously along the said guide ways, the said stencil and the said guide ways being adapted for the support of the stencils at the ends of the same to continuously close the circuits of the contacts at the said ends.

In testimony whereof I have affixed my signature in presence of two witnesses.

CHARLES H. SMITH.

Witnesses:
 JOHN H. SMILEY,
 CHARLES R. GILBERT.